US012791311B2

(12) United States Patent
Rizzardini et al.

(10) Patent No.: US 12,791,311 B2
(45) Date of Patent: Nov. 10, 2026

(54) LID ANGLE DETECTION

(71) Applicant: STMicroelectronics International N.V., Geneva (CH)

(72) Inventors: Federico Rizzardini, Settimo Milanese (IT); Lorenzo Bracco, Chivasso (IT)

(73) Assignee: STMicroelectronics International N.V., Geneva (CH)

( * ) Notice: Subject to any disclaimer, the term of this patent is extended or adjusted under 35 U.S.C. 154(b) by 272 days.

(21) Appl. No.: 18/793,572

(22) Filed: Aug. 2, 2024

(65) Prior Publication Data

US 2026/0036423 A1 Feb. 5, 2026

(51) Int. Cl.
*G01B 21/22* (2006.01)
*G01C 19/00* (2013.01)
*G01P 15/18* (2013.01)

(52) U.S. Cl.
CPC ............. *G01B 21/22* (2013.01); *G01C 19/00* (2013.01); *G01P 15/18* (2013.01)

(58) Field of Classification Search
CPC .......... G01B 21/22; G01C 19/00; G01P 15/18
USPC ............................................................ 73/493
See application file for complete search history.

(56) References Cited

U.S. PATENT DOCUMENTS

2017/0082461 A1 3/2017 DiFonzo et al.
2018/0039339 A1 2/2018 Henell
2019/0332343 A1 10/2019 Sylvan et al.
2021/0255686 A1* 8/2021 Rivolta ................. G06F 1/1677
2023/0384343 A1* 11/2023 Rizzardini ............. G01D 5/145
2023/0384837 A1 11/2023 Rizzardini et al.
2024/0085960 A1* 3/2024 Rizzardini ............ G06F 1/1652
2024/0401978 A1* 12/2024 Rizzardini .............. G01P 15/18

FOREIGN PATENT DOCUMENTS

EP 4207722 A1 7/2023
WO 2023204490 A1 10/2023

* cited by examiner

*Primary Examiner* — Peter J Macchiarolo
*Assistant Examiner* — Rodney T Frank
(74) *Attorney, Agent, or Firm* — Seed Intellectual Property Law Group LLP

(57) ABSTRACT

The present disclosure is directed to a device and method for lid angle detection that is accurate even if the device is activated in an upright position. While the device is in a sleep state, first and second sensor units measure acceleration and angular velocity, and calculate orientations of respective lid components based on the acceleration and angular velocity measurements. Upon the device exiting the sleep state, a processor determines a distance between the calculated orientations, remaps the distance to an estimated lid angle ranging from 0 to 360 degrees, sets the estimated lid angle as an initial lid angle, and updates the initial lid angle using, for example, two accelerometers; two accelerometers and two gyroscopes; two accelerometers and two magnetometers; or two accelerometers, two gyroscopes, and two magnetometers.

20 Claims, 5 Drawing Sheets

LID ANGLE DETECTION

BACKGROUND

Technical Field

The present disclosure is directed to lid angle detection.

Description of the Related Art

Lid angle detection involves determining the angle between two lid components of a foldable electronic device, such as a laptop and a foldable mobile device, that fold on to each other about a hinge or folding portion. Typically, one of the two lid components includes a display, and the other of the two lid components includes another display or a user input device, such as a keyboard.

The angle between the two lid components is often referred to as a lid or hinge angle. Generally, the lid angle of a foldable electronic device is equal to zero degrees when the foldable electronic device is in a closed state (e.g., the display of the first lid component faces the display of the second lid component), 180 degrees when the foldable electronic device is in an open and flat state (e.g., the display of first lid component and the display of the second lid component face in the same direction), and 360 degrees when the foldable electronic device is in a fully open and rotated state (e.g., the display of the first lid component and the display of the second lid component face in opposite directions).

Current lid angle detection solutions are high cost and have high power consumption. Further, for foldable mobile devices, many current lid angle detection solutions are unable to accurately determine a lid angle when the foldable mobile device is activated in an upright position (e.g., the hinge or folding portion of the foldable mobile device extends in a direction parallel to gravity) or in a non-steady state (e.g., while the foldable mobile device is being moved or shaken). In particular, the lid angle cannot be determined if the foldable mobile device is in upright position or in a non-steady state when starting the lid angle detection solution. In order to manage the corner case indicated above, the lid angle detection solution is always running (even when the foldable mobile device is otherwise in a sleep mode). This causes, in time, a high power consumption as a high powered processor is always active. Alternatively, hall sensors or magnetometers are used to solve the problem, adding cost and power consumption.

As foldable electronic devices, especially foldable mobile telephones, are becoming more popular, it is desirable for manufactures to incorporate an accurate, low cost lid angle detection solution, which also functions when the device is activated in the upright position, in foldable electronic devices. Furthermore, new or upcoming devices on the market that open from 0 to 360 degrees require a lid angle solution in order to adapt the user interface based on the lid angle value.

BRIEF SUMMARY

The present disclosure is directed to lid or hinge angle detection for foldable devices, such as a foldable mobile phone. Unlike current detection methods, the lid angle detection disclosed herein is able to detect the lid angle in a case where the foldable device is activated in an upright position (e.g., when the lid axis is parallel to gravity) or in a non-steady state (e.g., while the foldable mobile device is being moved or shaken) and in a range from 0 to 360 degrees. Further lid angle detection may continue to be performed while the device enters a sleep state.

The device includes a high powered application processor, and low powered first and second sensor units positioned in respective lid components. The application processor is the main processing unit of the device, and is put into a sleep state when the device is in a sleep state. The first and second sensor units are multi-sensor devices that include multiple sensors (e.g., an accelerometer, magnetometer, gyroscope, etc.), and are capable of performing simple algorithms. In contrast to the application processor, the first and second sensor units remain in an on state even when the device is in a sleep state.

When the device is in the sleep state, the first and second sensor units measure acceleration and angular velocity, and calculate orientations of the respective lid components based on the acceleration and angular velocity measurements. Upon the device and the application processor exiting the sleep state, the application processor determines a distance between the calculated orientations, remaps the distance to an estimated lid angle ranging from 0 to 360 degrees, and sets the estimated lid angle as an initial lid angle. The application processor subsequently updates the initial lid angle using one or more of acceleration, magnetometer, or gyroscope measurements.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of manufacturing electronic components, foldable devices, and sensors have not been described in detail to avoid obscuring the descriptions of other aspects of the present disclosure.

Unless the context requires otherwise, throughout the specification and claims that follow, the word “comprise” and variations thereof, such as “comprises” and “comprising,” are to be construed in an open, inclusive sense, that is, as “including, but not limited to.”

Reference throughout the specification to “one embodiment” or “an embodiment” means that a particular feature, structure, or characteristic described in connection with the embodiment is included in at least one embodiment. Thus, the appearance of the phrases “in one embodiment” or “in an embodiment” in various places throughout the specification are not necessarily all referring to the same aspect. Furthermore, the particular features, structures, or characteristics may be combined in any suitable manner in one or more aspects of the present disclosure.

As discussed above, current lid angle detection solutions are high cost and have high power consumption. Further, for foldable mobile devices, current lid angle detection solutions are unable to determine a lid angle when the foldable mobile device is activated in an upright position (e.g., the hinge or folding portion of the foldable mobile device extends in a direction parallel to gravity) or in a non-steady state (e.g., while the foldable mobile device is being moved or shaken).

The present disclosure is directed to a device and method for lid angle detection. The lid angle detection disclosed herein provides an accurate, low cost lid angle detection solution, which also functions while a foldable electronic device is activated in an upright position or in a non-steady state.

Figure 1:
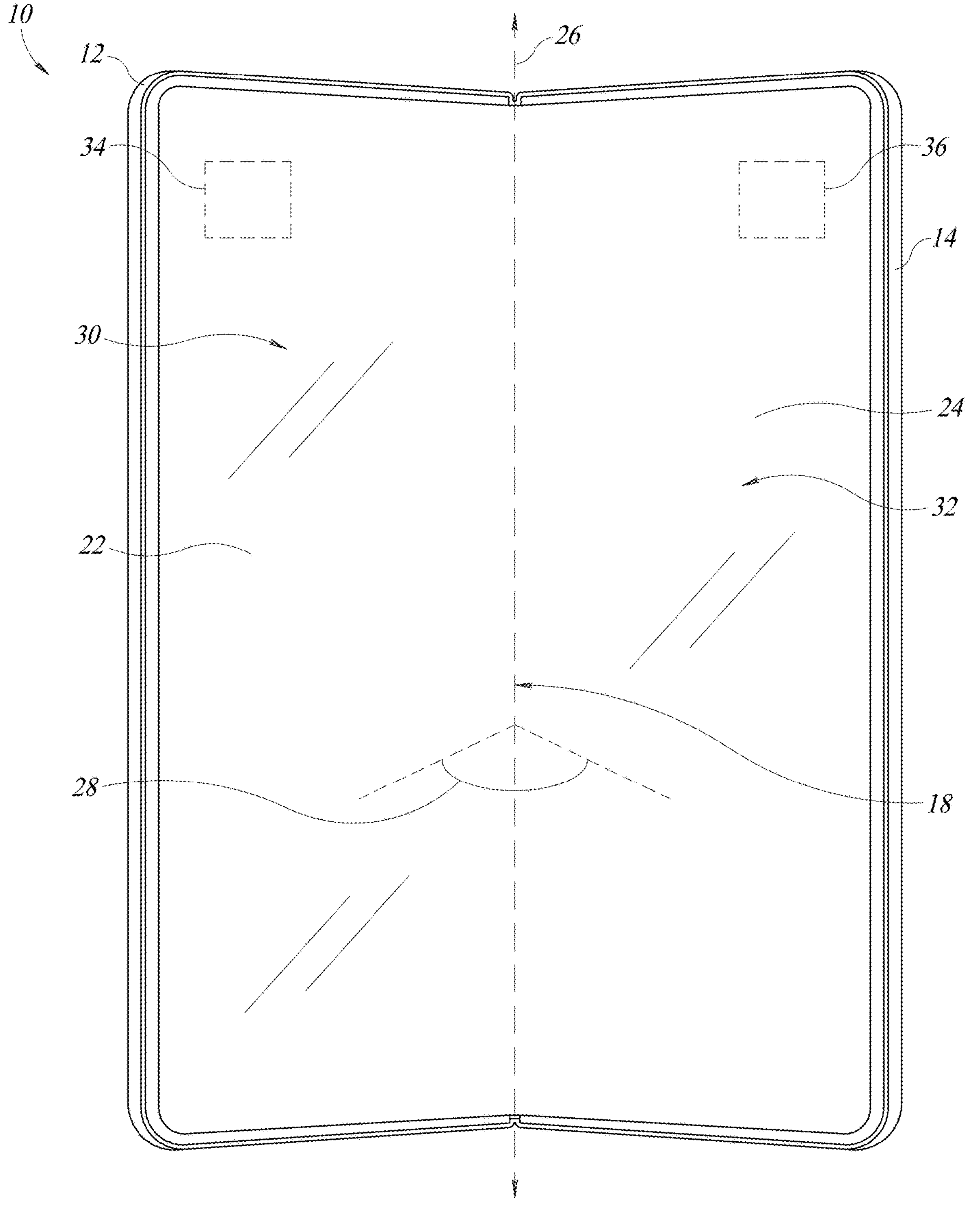
FIG. 1 is a device according to an embodiment disclosed herein.

FIG. 1 is a device 10 according to an embodiment disclosed herein. In this embodiment, the device 10 is a foldable mobile device, such as a portable smart device, tablet, and telephone. The device 10 may also be another type of device, such as a laptop. The device 10 includes a first lid component 12, a second lid component 14, and a hinge 18.

Each of the first lid component 12 and the second lid component 14 includes a casing or housing that houses internal components (e.g., processors, sensors, capacitors, resistors, amplifiers, speakers, etc.) of the device 10. As will be discussed in further detail below, a first sensor unit 34 and a second sensor unit 36 are housed within the first lid component 12 and the second lid component 14, respectively.

The first lid component 12 and the second lid component 14 include a first user interface 22 and a second user interface 24, respectively. In the embodiment shown in FIG. 1 and in the embodiments discussed below, the first user interface 22 and the second user interface 24 are displays. However, each of the first user interface 22 and the second user interface 24 may be a display (e.g., a monitor, touch screen, etc.), a user input device (e.g., buttons, a keyboard, etc.), and/or another type of user interface. In one embodiment, the first user interface 22 and the second user interface 24 are two portions of a single, flexible display.

The first lid component 12 and the second lid component 14 fold on to each other, similar to a book, about the hinge 18. The first lid component 12 and the second lid component 14 rotate relative to a hinge axis 26. The hinge 18 may be any type of mechanism that allows the first lid component 12 and the second lid component 14 to rotate relative to the hinge axis 26.

As will be discussed in further detail below, the device 10 performs lid angle detection to determine a lid angle 28 between the first lid component 12 and the second lid component 14. The lid angle 28 is the angle between a first surface 30 of the first lid component 12, more specifically the first user interface 22, and a second surface 32 of the second lid component 14, more specifically the second user interface 24. The lid angle 28 is equal to zero degrees when the foldable electronic device is in a closed state (e.g., the first surface 30 faces the second surface 32), 180 degrees when the foldable electronic device is in a flat state (e.g., the first surface 30 and the second surface 32 face in the same direction), and 360 degrees when the foldable electronic device is in a fully open state (e.g., the first surface 30 and the second surface 32 face in opposite directions).

Figure 2:
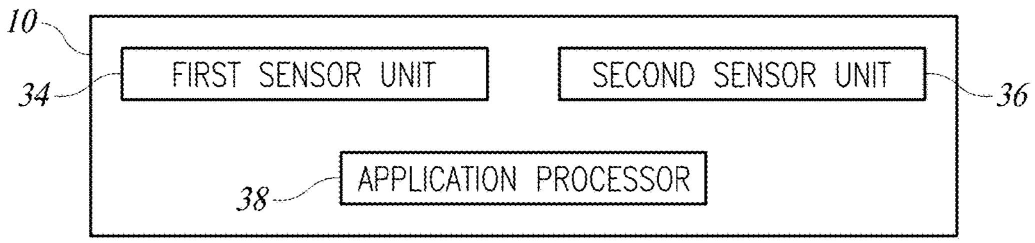
FIG. 2 is a block diagram of a device according to an embodiment disclosed herein.

FIG. 2 is a block diagram of the device 10 according to an embodiment disclosed herein. The device 10 includes a first sensor unit 34, a second sensor unit 36, and an application processor 38.

Each of the first sensor unit 34 and the second sensor unit 36 is a multi-sensor device that includes one or more types of sensors including, but not limited to, an accelerometer, a gyroscope, a magnetometer, and a hall sensor. Each of the first sensor unit 34 and the second sensor unit 36 includes circuitry to implement its various components. The accelerometer measures acceleration along one or more axes. The gyroscope measures angular velocity along one or more axes. The magnetometer measures magnetic fields along one or more axes.

Each of the first sensor unit 34 and the second sensor unit 36 also includes its own onboard memory and processor. The processor is configured to process data generated by the sensors, and execute simple programs, such as finite state machines and decision tree logic.

The first sensor unit 34 and the second sensor unit 36 are positioned in the first lid component 12 and the second lid component 14, respectively. As will be discussed in further detail below, the first sensor unit 34 and the second sensor unit 36 determine orientations of the first lid component 12 and the second lid component 14, respectively, for lid angle detection.

The first sensor unit 34 and the second sensor unit 36 are power-efficient, low-powered devices that remain on after the device 10 enters a sleep state. In one embodiment, each of the first sensor unit 34 and the second sensor unit 36 consumes between 5 and 120 microamps for processing. In the sleep state, the application processor 38 and other electronic components (e.g., speakers, sensors, processors) of the device 10 are set to a low-powered or off state.

The application processor 38 is a general purpose processing unit. The application processor 38 may be any type of processor, controller, or signal processor configured to process data. In one embodiment, the application processor 38 is the device's 10 own general purpose processor that, along with processing data for lid angle detection discussed below, is utilized to process data for the operating system, user applications, and other types of software of the device 10. As will be discussed in further detail below, the application processor 38 processes the orientations determined by the first lid component 12 and the second lid component 14 to obtain an initial lid angle value of the device 10, and performs lid angle detection to obtain current lid angle values.

The application processor 38 may be positioned within the first lid component 12, along with the first sensor unit 34; or the second lid component 14, along with the second sensor unit 36.

The application processor 38 is a high-powered processing unit that is set to a low-powered or off state when the device 10 enters the sleep state. In one embodiment, the application processor 38 consumes between 1 to few tenths of milliamps during processing. While in a low-powered or off state, the application processor 38 is unable to receive sensor measurements from the first sensor unit 34 and the second sensor unit 36 and, thus, unable to perform lid angle detection.

Figure 3:
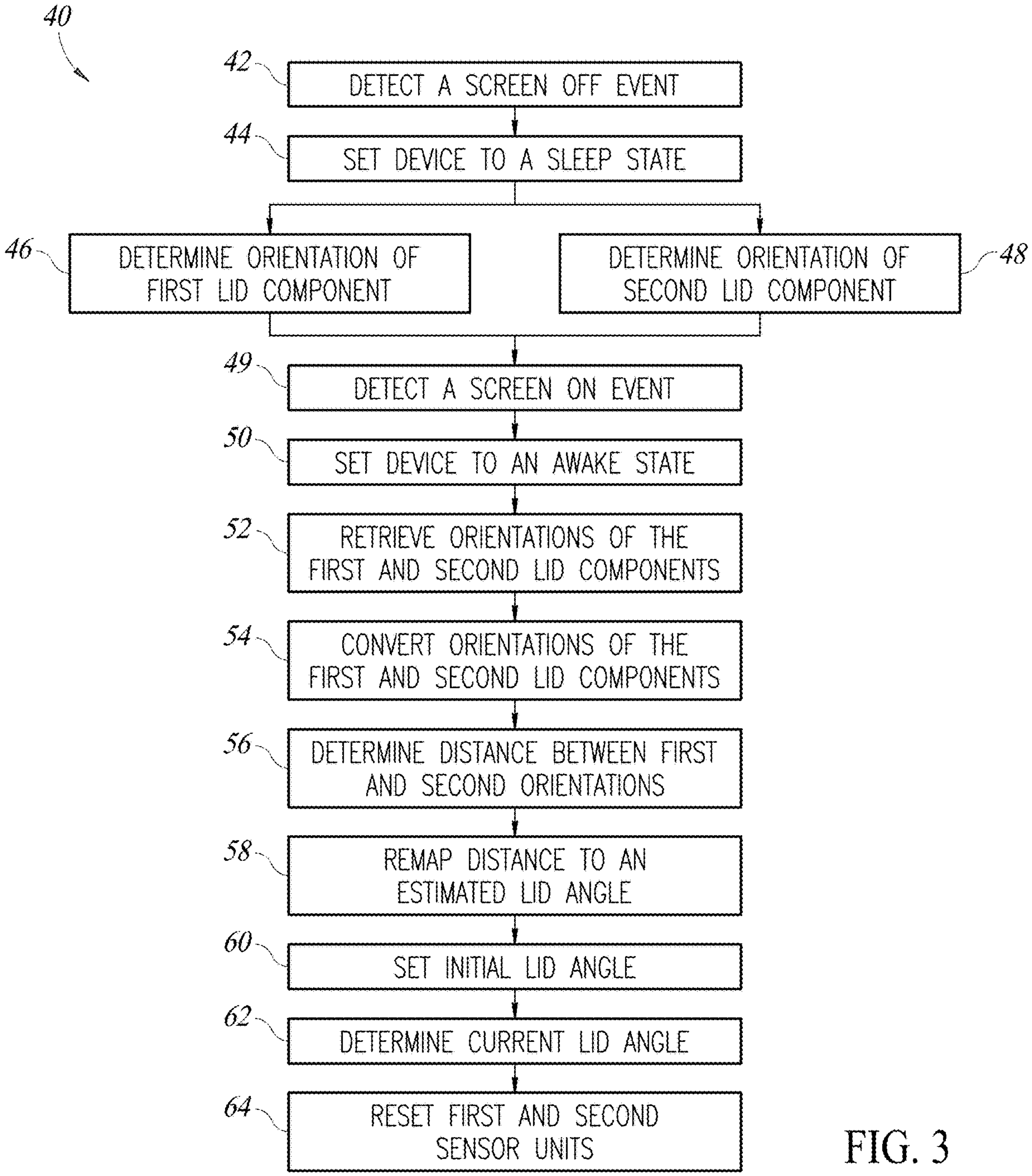
FIG. 3 is a flow diagram of a method according to an embodiment disclosed herein.

FIG. 3 is a flow diagram of a method 40 according to an embodiment disclosed herein. The method 40 performs lid angle detection for the device 10.

In block 42, the device 10 detects whether or not a screen off event has occurred. The screen off event may be detected by the first sensor unit 34, the second sensor unit 36, the application processor 38, or another electronic component (e.g., processor, sensor, etc.) included in the device 10.

In a screen off event, the first user interface 22 and/or the second user interface 24 of the device 10 are set to a low-powered or off state, and no images are displayed on the screens. In one embodiment, the screen off event occurs in response to a user initiating a power button of the device 10, in response to the device 10 being in a closed state (e.g., the first surface 30 of the first lid component 12 faces the second surface 32 of the second lid component 14 in FIG. 1), or in response to a determined amount of time of user inactivity. In a case where the device 10 detects the screen off event, the method 40 moves to block 44.

In block 44, the device 10 is set to a sleep state. As discussed above, in the sleep state, the application processor 38 and other electronic components (e.g., speakers, sensors, processors) of the device 10 are set to a low-powered or off state.

While in a low-powered or off state, the application processor 38 is unable to receive sensor measurements from the first sensor unit 34 and the second sensor unit 36 and, thus, is unable to perform lid angle detection. In contrast, the first sensor unit 34 and the second sensor unit 36 remain on and operational even when the device 10 enters the sleep state. The method 40 then moves to blocks 46 and 48, which may be performed concurrently.

It is noted that the device 10 is in the sleep state during blocks 46 and 48. Thus, the application processor 38 is in a low-powered or off state, while the first sensor unit 34 and the second sensor unit 36 remain on and operational. Block 46 and block 48 are performed by the first sensor unit 34 and the second sensor unit 36, respectively.

In block 46, the first sensor unit 34, more specifically a processor of the first sensor unit 34, determines an orientation or position of the first lid component 12, more specifically the first surface 30 of the first lid component 12. As discussed above with respect to FIG. 1, the first sensor unit 34 is positioned in the first lid component 12.

Similarly, in block 48, the second sensor unit 36, more specifically a processor of the second sensor unit 36, determines an orientation or position of the second lid component 14, more specifically the second surface 32 of the second lid component 14. As discussed above with respect to FIG. 1, the second sensor unit 36 is positioned in the second lid component 14.

The first sensor unit 34 and the second sensor unit 36 determine the orientations of the first lid component 12 and the second lid component 14, respectively, based on acceleration and angular velocity measurements along one or more axes. Further, the orientations are represented as quaternions.

In a case where the first sensor unit 34 includes a 3-axis accelerometer that measures accelerations along an X-axis, a Y-axis transverse to the X-axis, and Z-axis transverse to the X-axis and the Y-axis; and includes a 3-axis gyroscope that measures angular velocities along an X-axis, a Y-axis transverse to the X-axis, and Z-axis transverse to the X-axis and the Y-axis, the quaternion $q_1$ of the first lid component 12 is equal to $(x_1, y_1, z_1)$, where $x_1$, $y_1$, $z_1$ represent the vector component of the quaternion representing the orientation of the first lid component 12. Similarly, in a case where the second sensor unit 36 includes a 3-axis accelerometer and a 3-axis gyroscope, the quaternion $q_2$ of the second lid component 14 is equal to $(x_2, y_2, z_2)$, where $x_2$, $y_2$, $z_2$ represent the vector component of the quaternion representing the orientation of the second lid component 14.

The first sensor unit 34 and the second sensor unit 36 determine the orientations of the first lid component 12 and the second lid component 14, respectively, repeatedly to ensure that the orientations are current and accurate. In one embodiment, the first sensor unit 34 and the second sensor unit 36 determine the orientations of the first lid component 12 and the second lid component 14, respectively, at determined intervals (e.g., every 5, 10, 15 milliseconds, etc.).

Once the first sensor unit 34 determines the orientation of the first lid component 12 in block 46 and the second sensor unit 36 determines the orientation of the second lid component 14 in block 48 at least once, the method 40 moves to block 49.

In block 49, the device 10 detects whether or not a screen on event has occurred. The screen on event may be detected by the first sensor unit 34, the second sensor unit 36, the application processor 38, or another electronic component (e.g., processor, sensor, etc.) included in the device 10.

In a screen on event, the first user interface 22 or the second user interface 24 of the device 10 are set to an on state and display images. In one embodiment, the screen on event occurs in response to a user initiating a power button of the device 10, in response to the device 10 being in an open state (e.g., the first surface 30 of the first lid component 12 and the second surface 32 of the second lid component 14 face in the same direction in FIG. 1), or in response to a determined amount of time of user activity. In a case where the device 10 detects the screen on event, the method 40 moves to block 50.

In block 50, the device 10 is set to an awake state. In contrast to the sleep state, in the awake state, the application processor 38 and other electronic components (e.g., speakers, sensors, processors) of the device 10 are set to an on state and are fully operational. For example, the application processor 38 is able to receive sensor measurements from the first sensor unit 34 and the second sensor unit 36, and perform lid angle detection. The method 40 then moves to block 52. It is noted that the device 10 remains in the awake state during blocks 52 to 64.

In block 52, the application processor 38 retrieves the latest, most current orientations of the first lid component 12 and the second lid component 14 determined by the first sensor unit 34 and the second sensor unit 36, respectively, in blocks 46 and 48. In one embodiment, the orientations determined by the first sensor unit 34 and the second sensor unit 36 are saved in their respective internal memories, and the application processor 38 retrieves the orientations directly from the first sensor unit 34 and the second sensor unit 36. In another embodiment, the orientations determined by the first sensor unit 34 and the second sensor unit 36 are saved to a shared memory, which is shared between the first sensor unit 34, the second sensor unit 36, and the application processor 38; and the application processor 38 retrieves the orientations from the shared memory. The method 40 then moves to block 54.

In block 54, in order for the application processor to process orientation data generated by the first sensor unit 34 and the second sensor unit 36, the application processor 38 converts the format of the orientations of the first lid component 12 and the second lid component 14 to a format used by the application processor 38. For example, in one embodiment, the orientations determined by the first sensor unit 34 and the second sensor unit 36 are in a half precision floating point format, and the application processor 38 converts the orientations to a single precision floating point format.

In a case where the quaternion $q_1$ is represented using the vector component due to memory limitations, the quaternion $q_1$ of the first lid component 12 is converted to a quaternion $q_1'$ equal to $(x_{1'}, y_{1'}, z_{1'}, w_{1'})$, using equations (1) to (4) below:

$$x_1' = x_1 \quad (1)$$

$$y_1' = y_1 \quad (2)$$

$$z_1' = z_1 \quad (3)$$

$$w_1' = \sqrt{1 - (x_1'^2 + y_1'^2 + z_1'^2)} \quad (4)$$

Similarly, the quaternion $q_2$ of the second lid component 14 is converted to a quaternion $q_2'$ equal to $(x_{2'}, y_{2'}, z_{2'}, w_{2'})$, using equations (5) to (8) below:

$$x_2' = x_2 \quad (5)$$

$$y_2' = y_2 \quad (6)$$

$$z_2' = z_2 \quad (7)$$

$$w_2 = \sqrt{1 - (x_2'^2 + y_2'^2 + z_2'^2)} \quad (8)$$

The method 40 then moves to block 56. It is noted that block 54 may be removed from the method 40 in a case where the first sensor unit 34, the second sensor unit 36, and the application processor 38 utilize the same data formats. In this case, the method 40 moves from block 52 to block 56 where the quaternion $q_1$ and the quaternion $q_2$ are used instead of the converted quaternion $q_1'$ and the converted quaternion $q_2'$, respectively.

In block 56, the application processor 38 determines a distance d between the orientation of the first lid component 12 and the orientation of the second lid component 14. The distance d represents an angular distance between the first lid component 12 and the second lid component 14.

First, in block 56, the application processor 38 determines a difference quaternion $q_{diff}$ based on the quaternion $q_1'$ and the quaternion $q_2'$. The difference quaternion $q_{diff}$ represents a rotation from the quaternion $q_1'$ to the quaternion $q_2'$. The difference quaternion $q_{diff}$ is calculated using equation (9) below:

$$q_{diff} = q_2' * q_1'^{-1} \quad (9)$$

where $q_1'^{-1}$ is the inverse of quaternion $q_1'$ (e.g., calculated as a conjugate quaternion).

Second, in block 56, the application processor 38 converts the difference quaternion $q_{diff}$ to have a positive scalar part. For example, in case the scalar part of the difference quaternion $q_{diff}$ is negative, all of the quaternion elements, including the scalar part, of the difference quaternion $q_{diff}$ are multiplied by −1. This step may be skipped in case the scalar part of the difference quaternion $q_{diff}$ is already positive.

Third, in block 56, the application processor 38 determines the distance d between the first lid component 12 and the second lid component 14. As discussed above, the distance d represents an angular distance between the first lid component 12 and the second lid component 14. The distance d is calculated using equation (10) below:

$$d = 2 * \cos^{-1}(\text{real}\ (q_{diff})) \quad (10)$$

where real ($q_{diff}$) is the scalar part of the difference quaternion $q_{diff}$. The method 40 then moves to block 58.

In block 58, the application processor 38 remaps the distance d to an estimated lid angle $lid_o$ of the device 10. Due to the estimated lid angle $lid_o$ being determined based on the most current orientations of the first lid component 12 and the second lid component 14 retrieved in block 52, the estimated lid angle $lid_o$ is an estimated lid angle of the device 10 at the time of the screen on event in block 49. As discussed above with respect to FIG. 1, the lid angle is the angle between the first surface 30 of the first lid component 12, more specifically the first user interface 22, and the second surface 32 of the second lid component 14, more specifically the second user interface 24.

It is noted that in block 56, the range of the angular distance is limited from 0 to 180 degrees. In block 58, the distance d is remapped to an estimated lid angle $lid_o$ that has a range from 0 to 360 degrees.

First, in block 58, the application processor 38 determines a rotated vector part $v_r$ of the difference quaternion $q_{diff}$ that is in the same reference frame of the first lid component 12. The reference frame of the first lid component 12 is the reference frame used by the first sensor unit 34 for taking measurements (the X-axis, Y-axis, and Z-axis in which measurements are taken). Here, the X-axis of the reference frame of the first sensor unit 34 corresponds to and is aligned with the hinge axis 26.

The rotated vector part $v_r$ is determined based on the vector part v of the difference quaternion $q_{diff}$ determined in block 56. In particular, the rotated vector part $v_r$ is determined by rotating the vector part v to the same reference frame of the first lid component 12. The vector part v represents the rotation axis of the first lid component 12, which ideally corresponds to the hinge axis 26 in Earth's reference frame. The rotated vector part $v_r$ is calculated using equation (11) below:

$$v_r = q_1'^{-1} * v * q_1' \quad (11)$$

where $q_1'^{-1}$ is the inverse of quaternion $q_1'$ (e.g., calculated as a conjugate quaternion). In one embodiment, the vector part v is converted into a pure quaternion prior to using equation (11). After the rotation of the vector part v, the X-axis component of the rotated vector part $v_r$ is equal to a value selected from +1 and −1 (or within a threshold value of +1 or −1 due to small errors caused by non-idealities of the first sensor unit 34 and of the second sensor unit 36) as the X-axis of the reference frame of the first sensor unit 34 corresponds to the hinge axis 26.

Second, in block 58, the application processor 38 determines the estimated lid angle $lid_o$ of the device 10 based on the rotated vector part $v_r$ and the distance d determined in block 56. The minimum of the estimated lid angle $lid_o$ is zero degrees, which occurs when the device 10 is in a closed state (e.g., the first surface 30 faces the second surface 32). The maximum of the estimated lid angle $lid_o$ is 360 degrees, which occurs when the device 10 is in a fully open state (e.g., the first surface 30 and the second surface 32 face in opposite directions). The estimated lid angle $lid_o$ is calculated using equation (12) below:

$$lid_o = 180 - \text{sign}(v_{rx}) * d \tag{12}$$

where $v_{rx}$ is the X-axis component of rotated vector part $v_r$, and the sign function determines the sign (+1 or −1) of $v_{rx}$. The sign of $v_{rx}$ indicates the direction of rotation around the hinge axis 26. The method then moves to block 60.

As discussed above, the estimated lid angle $lid_o$ has a range from 0 to 360 degrees. However, the estimated lid angle $lid_o$ may also be clamped or clipped to a determined maximum value. In one embodiment, in case the device 10 should have a maximum lid angle of 180 degrees, the estimated lid angle $lid_o$ is set to 180 degrees in case the estimated lid angle $lid_o$ determined in block 58 is greater than 180 degrees and equal to or less than 270 degrees, and is set to 0 degrees in case the estimated lid angle $lid_o$ determined in block 58 is greater than 270 degrees and equal to or less than 360 degrees.

In block 60, the application processor 38 sets the estimated lid angle $lid_o$ as an initial lid angle of the device 10, which is the lid angle between the first surface 30 of the first lid component 12 and the second surface 32 of the second lid component 14 at the time of the screen on event in block 49 and the awake state in block 50. The method 40 then moves to block 62.

Using the estimated lid angle $lid_o$, which was previously determined, as the initial lid angle of the device 10 is particularly useful in situations where lid angle detection is currently unreliable or inaccurate. For example, many lid angle detection solutions are often inaccurate when the device 10 is activated in an upright position or is in a non-steady state.

In one embodiment, the estimated lid angle $lid_o$ is set as the initial lid angle in a case where the device 10 is activated in an upright position or is in a non-steady state. In the upright position, referring to FIG. 1, the hinge axis 26 of the device 10 is parallel to gravity. In the non-steady state, the device 10 is undergoing movement by, for example, being shaken or moved by a user.

If the device 10 is not in the upright position (e.g., the hinge axis 26 is not parallel to gravity) or not in the non-steady state (e.g., the device 10 is in a steady state), block 60 is not performed and the method 40 moves from block 58 to block 62. In another embodiment, if the device 10 is not in the upright position or not in the non-steady state, blocks 52, 54, 56, 58 are not performed and the method 40 moves from block 50 to block 62.

The application processor 38 determines the device 10 is in the upright position based on acceleration measurements, gyroscope measurements, or a combination thereof that are generated by one or more of the first sensor unit 34 and the second sensor unit 36. For example, the application processor 38 determines the device 10 is in the upright position in response to the acceleration measurements and/or the gyroscope measurements indicating that the hinge axis 26 of the device 10 is parallel to gravity.

The application processor 38 determines the device 10 is in the non-steady state based on acceleration measurements, gyroscope measurements, or a combination thereof that are generated by one or more of the first sensor unit 34 and the second sensor unit 36. For example, the application processor 38 determines the device 10 is in the non-steady state in response to one or more of acceleration, a variance of acceleration, a mean of acceleration, a difference between a current acceleration and the mean of acceleration, angular velocity, a variance of angular velocity, a mean of angular velocity, or a difference between a current angular velocity and the mean of angular velocity, along one or more axes, being greater than a respective threshold value.

In block 62, the application processor 38 determines a current lid angle of the device 10. In one embodiment, the application processor 38 determines the current lid angle based on the initial lid angle determined in block 60. For example, the application processor 38 determines the current lid angle based on a detected change in lid angle starting from the initial lid angle.

As the device 10 is in the awake state and not limited to utilizing just the first sensor unit 34 and the second sensor unit 36, the device 10 may determine the current lid angle with any number of different techniques of calculating lid angle, which utilize, for example, two accelerometers; two accelerometers and two gyroscopes; two accelerometers and two magnetometers; or two accelerometers, two gyroscopes, and two magnetometers. In addition, any of these configurations can be combined with a hall sensor and a magnet. The usage of two gyroscopes could also be implemented together with a hall sensor and a magnet (or an equivalent "switch" sensor to detect when the device is closed).

For example, the application processor 38 may recursively determine the current lid angle between the first lid component 12 and the second lid component 14 as a function of measurement signals generated by a first accelerometer of the first sensor unit 34, a second accelerometer of the second sensor unit 36, a first gyroscope of the first sensor unit 34, and a second gyroscope of the second sensor unit 36. In this example, the current lid angle is determined as a function of a weight indicative of a reliability of the measurement signals as being indicative of the lid angle between the first lid component 12 and the second lid component 14. In some cases, the application processor 38 may also generate a first intermediate calculation indicative of the lid angle between the first lid component 12 and the second lid component 14 as a function of measurement signals generated by the first and second accelerometers; generate a second intermediate calculation indicative of the lid angle as a function of measurement signals generated by the first and second gyroscopes; and determine the current lid angle as a weighted sum of the first intermediate calculation and the second intermediate calculation.

As another example, a first magnetometer of the first sensor unit 34 and a second magnetometer of the second sensor unit 36 may generate first signals that are indicative of measurements of a magnetic field external to the device 10 and are indicative of a relative orientation of the first lid component 12 with respect to the second lid component 14. The application processor 38 may then acquire the first signals; generate, as a function of the first signals, a calibration parameter indicative of a condition of calibration of the first and second magnetometers; generate, as a function of the first signals, a reliability value indicative of a condition of reliability of the first signals; calculate an intermediate value of the current lid angle based on the first signals; and calculate the current lid angle based on the calibration parameter, the reliability value, and the intermediate value. In order to improve accuracy, the calibration parameter, the reliability value, and the intermediate value may also be used in conjunction with the current lid angle determined with accelerometer and gyroscopes discussed above.

Once the current lid angle is determined, a function of the device 10 may be controlled based on the current lid angle. For example, power states of the device, and user interfaces displayed on the first user interface 22 and the second user interface 24 may be adjusted based on the current lid angle.

The method 40 then moves to block 64. However, it is noted that execution of block 62 is repeated (e.g., every 5, 10, 15 milliseconds, etc.) while block 64 is performed to ensure the orientations of the first lid component 12 and the second lid component 14 remain accurate. Further, at this time, block 42 is performed concurrently with block 62 in order to detect whether or not another screen off event has occurred. The repeated execution of block 62 halts upon detection of a screen off event.

In block 64, the application processor 38 resets the orientation processing logic of the first sensor unit 34 and the second sensor unit 36 (e.g., the processing logic used in blocks 46 and 48). Resetting the orientation processing logic improves accuracy as measurements errors often accumulate over time, causing a drift in the yaw estimations of the orientations of the first lid component 12 and the second lid component 14.

The reset of the orientation processing logic of the first sensor unit 34 and the second sensor unit 36 is performed upon determining the device 10 is in a known state.

In a first embodiment, the resetting of the orientation processing logic is performed when the device 10 is in a steady state and a flat state. Being in the steady state reduces error caused by linear acceleration when the first sensor unit 34 and the second sensor unit 36 are initialized. Further, the flat state intrinsically forces the first sensor unit 34 and the second sensor unit 36 to start with the same yaw.

In the steady state, the device 10 is not being moved or shaken. The application processor 38 determines the device 10 is in the steady state based on acceleration measurements, gyroscope measurements, or a combination thereof that are generated by one or more of the first sensor unit 34 and the second sensor unit 36. For example, the application processor 38 determines the device 10 is in the steady state in response to one or more of acceleration, a variance of acceleration, a mean of acceleration, a difference between a current acceleration and the mean of acceleration, angular velocity, a variance of angular velocity, a mean of angular velocity, or a difference between a current angular velocity and the mean of angular velocity, along one or more axes being less than a respective threshold value.

In the flat state, referring to FIG. 1, the first surface 30 and the second surface 32 face in the same direction. The application processor 38 determines the device 10 is in the flat state based on the current lid angle determined in block 62. For example, the application processor 38 determines the device 10 is in the flat state in response to the current lid angle being within a threshold angle (e.g., 1, 2, or 3 degrees, etc.) of 180 degrees.

In response to determining the device 10 is in the steady state and the flat state, the application processor 38 transmits a reset signal to the first sensor unit 34 and the second sensor unit 36. Upon receiving the reset signal, the orientation processing logic of the first sensor unit 34 and the second sensor unit 36 is reset.

In a second embodiment, the resetting of the orientation processing logic is performed when the device 10 is in (1) a steady state and (2) either in a flat state or a closed state. As discussed above, being in the steady state reduces error caused by linear acceleration when the first sensor unit 34 and the second sensor unit 36 are initialized.

As discussed above, in the flat state, referring to FIG. 1, the first surface 30 and the second surface 32 face in the same direction. In contrast, in the closed state the first surface 30 and the second surface 32 face each other. The application processor 38 determines the device 10 is in the closed state based on the current lid angle determined in block 62. For example, the application processor 38 determines the device 10 is in the closed state in response to the current lid angle being within a threshold angle (e.g., 1, 2, or 3 degrees, etc.) of 0 degrees.

In response to determining the device 10 is in (1) the steady state and (2) either in the flat state or the closed state, the application processor 38 transmits a reset signal to the first sensor unit 34 and the second sensor unit 36. Upon receiving the reset signal, the orientation processing logic of the first sensor unit 34 and the second sensor unit 36 is reset.

In the second embodiment, the configuration of either the first sensor unit 34 orientation processing logic and/or the second sensor unit 36 orientation processing logic is changed based on whether the resetting is in response to the device 10 being in the flat state or the closed state. More specifically, the coordinate system (e.g., cast-north-up (ENU) coordinate system) of one of the first sensor unit 34 orientation processing logic and the second sensor unit 36 orientation processing logic is set to be aligned with the coordinate system of the other of the first sensor unit 34 orientation processing logic and the second sensor unit 36 orientation processing logic based on whether the resetting is caused by the device 10 being in the flat state or the closed state.

In a case where the first sensor unit 34 orientation processing logic and the second sensor unit 36 orientation processing logic both utilize the same coordinate system, the coordinate systems of both the first sensor unit 34 orientation processing logic and the second sensor unit 36 orientation processing logic are set to respective default coordinate systems in response to the resetting being caused by the device 10 being in the flat state. Conversely, in the case where the first sensor unit 34 orientation processing logic and the second sensor unit 36 orientation processing logic both utilize the same coordinate system, the coordinate system of one of the first sensor unit 34 orientation processing logic and the second sensor unit 36 orientation processing logic is aligned with the coordinate system of the other of the first sensor unit 34 orientation processing logic and the second sensor unit 36 orientation processing logic in response to the resetting being caused by the device 10 being in the closed state. For example, in the next execution of the method 40, the coordinates system of the first sensor unit 34 orientation processing logic is changed to be aligned to the coordinate system of the second sensor unit 36 orientation processing logic by applying a transformation matrix to the coordinates system of the first sensor unit 34 orientation processing logic.

In addition, in the second embodiment and in the next execution of the method 40, the remapping in block 58 is customized based on whether the resetting is in response to the device 10 being in the flat state or the closed state.

In a case where the resetting is caused by the device 10 being in the flat state, the estimated lid angle $lid_o$ is calculated using equation (12) as discussed above. Conversely, in a case where the resetting is caused by the device 10 being in the closed state, the estimated lid angle $lid_o$ is calculated using equation (13) below:

$$lid_o = 180 - \text{sign}(v_{rx}) * (d - 180) \tag{13}$$

It is noted that in case the two quaternions $q_1'$ and $q_2'$ are identical, the angular distance is d=0 and $v_{rx}=0$, leading to a wrong $lid_o=180$ degrees. This case is managed as a special case by setting $v_{rx}$ to −1 or +1, in order to get $lid_o$ equal to 0 or 360 degrees.

In one embodiment, in order to avoid excessive resets of the first sensor unit 34 and the second sensor unit 36, the application processor 38 transmits the reset signal in a case where a threshold amount of time has passed since the previous reset signal transmission. For example, in response to determining the device 10 is in the steady state and the flat state or closed state, the application processor 38 transmits the reset signal to the first sensor unit 34 and the second sensor unit 36 in a case where a threshold amount of time (e.g., 30 seconds, 1 minute, etc.) has passed since the previous reset signal transmission. Conversely, in response to determining the device 10 is in the steady state and the flat state or closed state, the application processor 38 skips transmission of (i.e., does not transmit) the reset signal to the first sensor unit 34 and the second sensor unit 36 in a case where the threshold amount of time has not passed since the previous reset signal transmission.

Upon completion of block 64, the method 40 is repeated. Stated differently, the method 40 returns to block 42.

Figure 4:
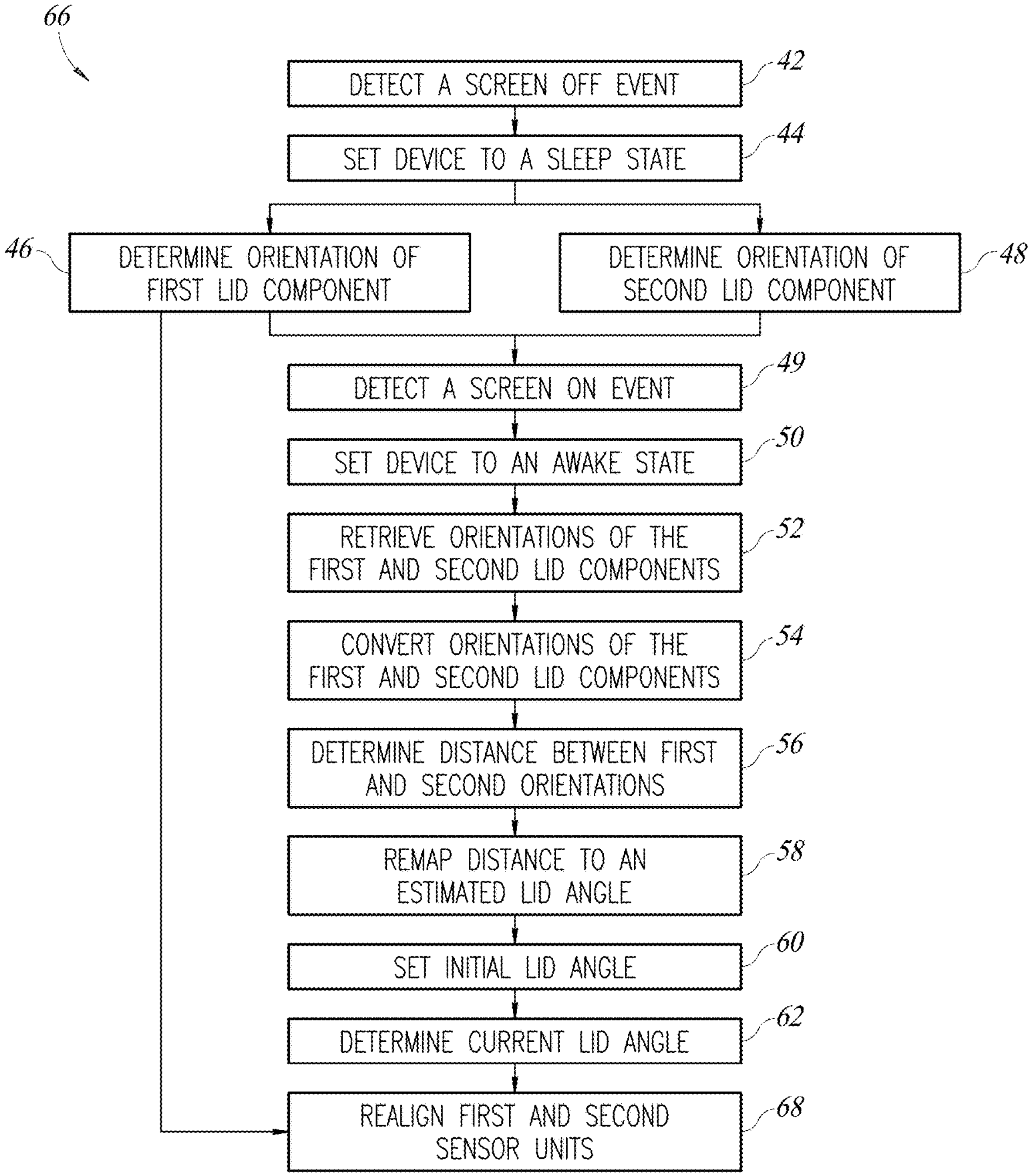
FIG. 4 is a flow diagram of a method according to another embodiment disclosed herein.

FIG. 4 is a flow diagram of a method 66 according to another embodiment disclosed herein. Similar to the method 40 discussed above, the method 66 performs lid angle detection for the device 10.

In the method 40, the orientation processing logic of the first sensor unit 34 and the second sensor unit 36 are reset in order to improve accuracy as measurements errors often accumulate over time, causing a drift in the yaw estimations of the orientations of the first lid component 12 and the second lid component 14. The resetting of the orientation processing logic is performed in cases where the device 10 is in a steady state and a flat state or closed state. In contrast, in the method 66, the first sensor unit 34 orientation and the second sensor unit 36 orientation are realigned with each other upon determining the current lid angle of the device 10 in block 62 instead of resetting the orientation processing logic of the first sensor unit 34 and the second sensor unit 36 in block 64.

The method 66 includes blocks 42, 44, 46, 48, 49, 50, 52, 54, 56, 58, 60, and 62 as discussed above with respect to FIG. 3. Once the current lid angle of the device is determined in block 62, the method 66 moves to block 68.

In block 68, the application processor 38 realigns orientations measured by the first sensor unit 34 and the second sensor unit 36 with each other in order to remove the differential yaw error caused by drift in yaw estimations of the orientations of the first lid component 12 and the second lid component 14. Drift in yaw estimations of the orientations of the first lid component 12 and the second lid component 14 cause a differential yaw error between the first lid component 12 and the second lid component 14.

Figure 5:
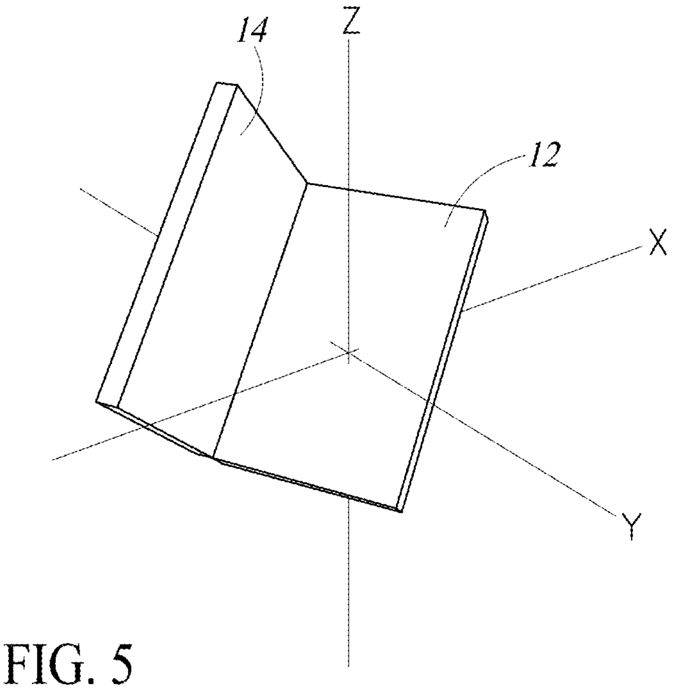
FIG. 5 is a visual representation of a first lid component and a second lid component with a lid angle of 90 degrees in an ideal case according to an embodiment disclosed herein.

For example, FIG. 5 is a visual representation of the first lid component 12 and the second lid component 14 with a lid angle of 90 degrees in an ideal case according to an embodiment disclosed herein. The first lid component 12 and the second lid component 14 are shown in Earth's reference frame. In the ideal case, the orientations of the first lid component 12 and the second lid component 14 are computed correctly with no drift in yaw estimations and no differential yaw error between the first lid component 12 and the second lid component 14. Accordingly, the current lid angle will be computed correctly as 90 degrees.

Figure 6:
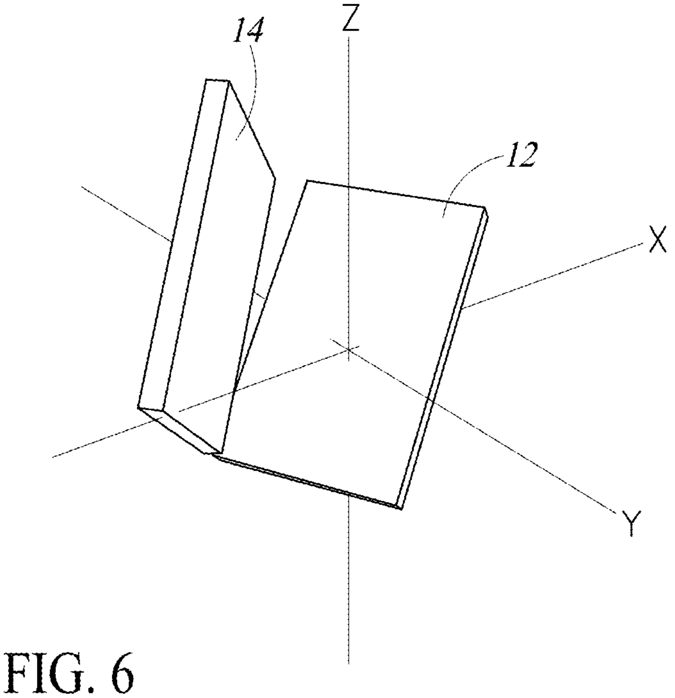
FIG. 6 is a visual representation of a first lid component and a second lid component with a lid angle of 90 degrees in an unideal case according to an embodiment disclosed herein.

In contrast, FIG. 6 is a visual representation of the first lid component 12 and the second lid component 14 with a lid angle of 90 degrees in an unideal case according to an embodiment disclosed herein. The first lid component 12 and the second lid component 14 are shown in Earth's reference frame. In the unideal case, drift in yaw estimations of the first lid component 12 and the second lid component 14 occur. As a result, a differential yaw error between the first lid component 12 orientation and the second lid component 14 orientation is introduced. For example, the first lid component 12 orientation and the second lid component 14 orientation are no longer being computed to be aligned along the hinge axis. Accordingly, the current lid angle will not be computed corrected as 90 degrees.

The realignment in block 68 utilizes the orientation of the first lid component 12 determined in block 46 and the current lid angle determined in block 62. The realignment is performed by assuming the orientation of the first lid component 12 is accurate, and utilizing the orientation of the first lid component 12 and the current lid angle to realign the orientation of the second lid component 14. It is noted that, in contrast to the resetting in block 64 of the method 40, the device 10 does not have to be in a steady state and a flat state or closed state for the realignment.

First, the application processor 38 determines a rotation quaternion $q_{2rot}$ of the second lid component 14. The rotation quaternion $q_{2rot}$ is the orientation change of the second lid component 14 due to just lid angle rotation with respect to the Earth's reference frame. The rotation quaternion $q_{2rot}$ is calculated using equations (14) and (15) below:

$$\theta = \pi - \text{current lid angle} \tag{14}$$

$$q_{2rot} = \cos\frac{\theta}{2} + \sin\frac{\theta}{2}i + 0j + 0k \tag{15}$$

where the current lid angle is determined in block 62; and i, j, and k are basis vectors or elements representing the X-axis, a Y-axis, and Z-axis, respectively, in the Earth's reference frame.

Figure 7:
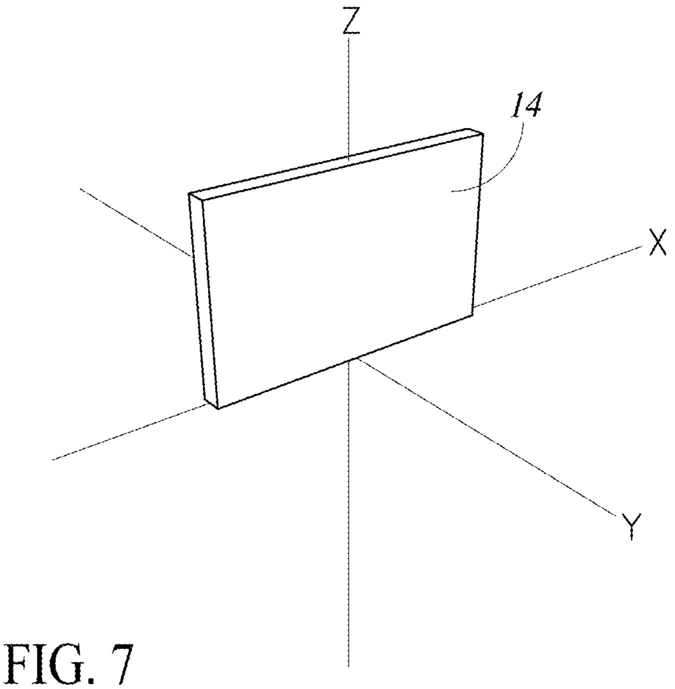
FIG. 7 is a visual representation of a second lid angle component initially aligned with the Earth's reference frame and rotated by a quaternion representing the lid angle rotation according to an embodiment disclosed herein.

FIG. 7, for example, is a visual representation of the rotation quaternion $q_{2rot}$ of the second lid component 14 according to an embodiment disclosed herein. In this example, the second lid component 14 is rotated 90 degrees about the Earth's X-axis.

In another embodiment, the current lid angle is a lid angle determined by other methods besides block 62. For example, the current lid angle may be determined by system information that utilizes measurements of (1) a first accelerometer included in the first lid component 12 (e.g., in the first sensor unit 34) and a second accelerometer included in the second lid component 14 (e.g., in the second sensor unit 36); (2) a first accelerometer and a first gyroscope included in the first lid component 12 (e.g., in the first sensor unit 34) and a second accelerometer and a second gyroscope included in the second lid component 14 (e.g., in the second sensor unit 36); (3) a first accelerometer, a first gyroscope, a first magnetometer included in the first lid component 12 (e.g., in the first sensor unit 34) and a second accelerometer, a second gyroscope, and a second magnetometer included in the second lid component 14 (e.g., in the second sensor unit 36); (4) a first accelerometer and a first magnetometer included in the first lid component 12 (e.g., in the first sensor unit 34) and a second accelerometer and a second magnetometer included in the second lid component 14 (e.g., in the second sensor unit 36); (5) a first gyroscope and a first magnetometer included in the first lid component 12 (e.g., in the first sensor unit 34) and a second gyroscope and a second magnetometer included in the second lid component 14 (e.g., in the second sensor unit 36); (6) a first magnetometer sensor included in the first lid component 12 (e.g., in the first sensor unit 34) and a second magnetometer sensor included in the second lid component 14 (e.g., in the second sensor unit 36); (7) a hall sensor included in the first lid component 12, influenced by the magnetic field generated by a magnet included in the second lid component 14; or (8) other types of sensors.

Next, the application processor 38 determines a realigned quaternion $q_{2realign}$ of the second lid component 14. The realigned quaternion $q_{2realign}$ is the orientation of the first lid component 12 rotated by the current lid angle around the hinge axis 26, and, thus, represents the correct orientation of the second lid component 14 relative to the first lid component 12. The realigned quaternion $q_{2realign}$ is calculated using equation (16) below:

$$q_{2realign} = q_1 * quat_{2rot} \tag{16}$$

where $q_1$ is the quaternion $q_1$ of the first lid component 12 determined in block 46, and "*" denotes the Hamilton product. In one embodiment, as discussed above with respect to block 54, the quaternion $q_1$ determined by the first sensor unit 34 is in a half precision floating point format, and the application processor 38 converts the quaternion $q_1$ to a single precision floating point format for processing by the application processor 38.

Figure 8:
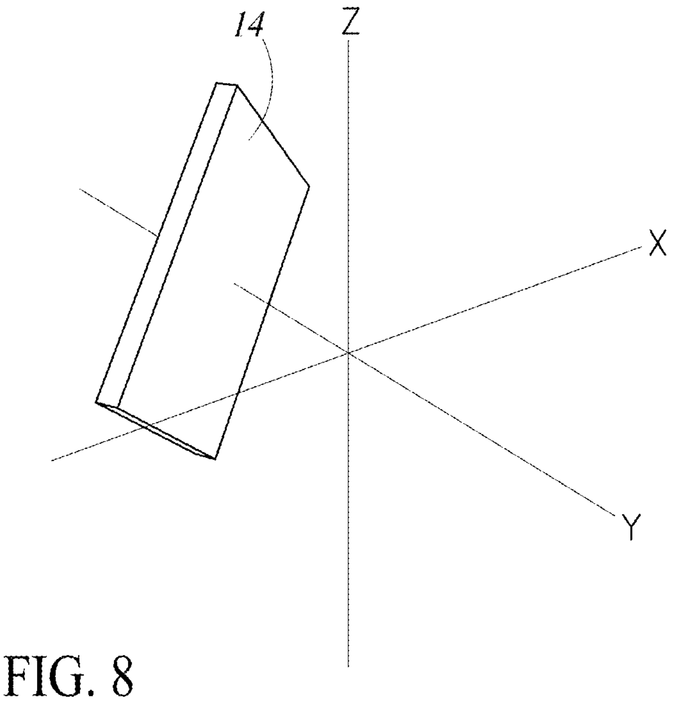
FIG. 8 is a visual representation of a second lid angle component initially aligned with the Earth's reference frame and rotated by a realigned quaternion according to an embodiment disclosed herein.

FIG. 8, for example, is a visual representation of the realigned quaternion $q_{2realign}$ of the second lid component 14 according to an embodiment disclosed herein. In this example, the second lid component 14, originally aligned to the Earth's frame, is firstly rotated by the current lid angle (in this example equal to 90 degrees) about the Earth's X-axis and subsequently rotated by the quaternion $q_1$ representing the current orientation of the first lid component 12. As a result, the second lid component 14 is realigned with the first lid component 12 with no differential yaw error between the first lid component 12 and the second lid component 14, as shown in FIG. 5. Accordingly, the current lid angle will be computed correctly as 90 degrees.

The realigned quaternion $q_{2realign}$ is then set as the new quaternion $q_2$ of the second lid component 14. The method 66 is then repeated. The new quaternion $q_2$ (i.e., the realigned quaternion $q_{2realign}$) will then be updated in block 48 and retrieved in block 52. In one embodiment, the realigned quaternion $q_{2realign}$ is converted back to a half precision floating point format, and stored in memory as the quaternion $q_2$ in the half precision floating point format.

Although the realignment performed in block 68 is performed subsequent to block 62 in FIG. 4, the realignment may be triggered at other times as well. For example, the realignment may be performed in response to a subsequent screen off event being detected, periodically, on-demand, etc.

The various embodiments disclosed herein provide a device and method for lid angle detection. While the device is in the sleep state, first and second sensor units measure acceleration and angular velocity, and calculate orientations of the respective lid components based on the acceleration and angular velocity measurements. Upon the device exiting the sleep state, the application processor estimates the lid angle using the calculated orientations, sets the estimated lid angle as an initial lid angle, and updates the initial lid angle using one or more of acceleration, magnetometer, or gyroscope measurements. As a result, the initial lid angle is accurate even in cases where the device is in an upright position or a non-steady state upon exiting the sleep state. Further, utilizing the first and second sensor units to estimate the respective lid orientations while the device is in the sleep state lowers the overall system current consumption, since the device does not have to be kept in an active state.

A device may be summarized as including: a first component including: a first user interface; and a first sensor unit including a first accelerometer, a first gyroscope, and a first processor, the first processor configured to determine a first orientation of the first component based on measurements by the first accelerometer and the first gyroscope; a second component coupled to the first component, the first component and the second component configured to rotate relative to a hinge axis, the second component including: a second user interface; and a second sensor unit including a second accelerometer, a second gyroscope, and a second processor, the second processor configured to determine a second orientation of the second component based on measurements by the second accelerometer and the second gyroscope; and a third processor configured to: determine a distance between the first orientation and the second orientation; and remap the distance to an estimated lid angle relative to the hinge axis and between the first component and the second component, the estimated lid angle having a value between 0 and 360 degrees.

The third processor is configured to, in case the estimated lid angle is greater than 180 degrees and equal to or less than 270 degrees, set the estimated lid angle to 180 degrees; and, in case the estimated lid angle is greater than 270 degrees and equal to or less than 360 degrees, set the estimated lid angle to 0 degrees.

The first orientation is a first quaternion of the first component, and the second orientation is a second quaternion of the second component, and the third processor is configured to: determine a difference quaternion based on the first quaternion and the second quaternion; and determine the distance based on the difference quaternion.

The third processor is configured to: determine a rotated vector part based on a vector part of the difference quaternion rotated by the first quaternion.

The third processor is configured to: remap the distance to the estimated lid angle based on rotated vector part.

The first processor determines the first orientation and the second processor determines the second orientation in a case where the device is in a sleep state, and the third processor determines the distance and remaps the distance to the estimated lid angle in a case where the device is in an awake state.

The third processor is configured to set the estimated lid angle as an initial lid angle of the device, and the initial lid angle is an angle relative to the hinge axis and between the first component and the second component subsequent to the device exiting the sleep state and entering the awake state.

The third processor sets the estimated lid angle as the initial lid angle in a case where the device is in an upright position or in a non-steady state.

The third processor is configured to: determine the device is in a flat state in which the first user interface and the second user interface face the same direction; determine the device is in a steady state; and reset orientation processing logic of the first sensor unit and orientation processing logic of the second sensor unit in a case where the device is in the flat state and the steady state.

The third processor is configured to: determine the device is in a steady state; determine the device is in a flat state or a closed state, the first user interface and the second user interface facing the same direction in the flat state, the first user interface and the second user interface facing each other in the closed state; and reset orientation processing logic of the first sensor unit and orientation processing logic of the second sensor unit in a case where the device is in (1) the steady state and (2) the flat state or the closed state.

The third processor is configured to: realign the second orientation with the first orientation based on the first orientation and a current lid angle between the first component and the second component.

A method may be summarized as including: determining, by a first sensor unit, a first orientation of a first component of a device, the first component including a first user interface and the first sensor unit, the first sensor unit including a first accelerometer and a first gyroscope, the first sensor unit determining the first orientation based on measurements by the first accelerometer and the first gyroscope; determining, by a second sensor unit, a second orientation of a second component of the device, the first component and the second component configured to rotate relative to a hinge axis, the second component including a second user interface and the second sensor unit, the second sensor unit including a second accelerometer and a second gyroscope, the second sensor unit determining the second orientation based on measurements by the second accelerometer and the second gyroscope; and determining, by a third processor, a distance between the first orientation and the second orientation; and remapping, by the third processor, the distance to an estimated lid angle relative to the hinge axis and between the first component and the second component, the estimated lid angle having a value between 0 and 360 degrees.

The first orientation is a first quaternion of the first component, and the second orientation is a second quaternion of the second component.

The method may further include: determining, by the third processor, a difference quaternion based on the first quaternion and the second quaternion; and determining, by the third processor, the distance based on the difference quaternion.

The method may further include: determining, by the third processor, a rotated vector part based on a vector part of the difference quaternion rotated by the first quaternion.

The method may further include: remapping, by the third processor, the distance to the estimated lid angle based on rotated vector part.

A device may be summarized as including: a first multi-sensor device; a first housing including the first multi-sensor device, the first multi-sensor device configured to determine a first orientation of the first housing based on measurements generated by the first multi-sensor device; a second multi-sensor device; a second housing coupled to the first housing, the first housing and the second housing configured to rotate relative to a hinge axis, the second housing including the second multi-sensor device, the second multi-sensor device configured to determine a second orientation of the second housing based on measurements generated by the second multi-sensor device; and a processor configured to: determine a distance between the first orientation and the second orientation; and remap the distance to an estimated lid angle relative to the hinge axis and between the first housing and the second housing, the estimated lid angle having a value between 0 and 360 degrees.

The first orientation is a first quaternion of the first housing, and the second orientation is a second quaternion of the second housing, and the processor is configured to: determine a difference quaternion based on the first quaternion and the second quaternion; and determine the distance based on the difference quaternion.

The processor is configured to: determine a rotated vector part based on a vector part of the difference quaternion rotated by the first quaternion.

The processor is configured to: remap the distance to the estimated lid angle based on rotated vector part.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:

a first component including:

a first user interface; and a first sensor unit including a first accelerometer, a first gyroscope, and a first processor, the first processor configured to determine a first orientation of the first component based on measurements by the first accelerometer and the first gyroscope;

a second component coupled to the first component, the first component and the second component configured to rotate relative to a hinge axis, the second component including:

a second user interface; and a second sensor unit including a second accelerometer, a second gyroscope, and a second processor, the second processor configured to determine a second orientation of the second component based on measurements by the second accelerometer and the second gyroscope; and a third processor configured to:

determine a distance between the first orientation and the second orientation; and remap the distance to an estimated lid angle relative to the hinge axis and between the first component and the second component, the estimated lid angle having a value between 0 and 360 degrees.

2. The device of claim 1 wherein the third processor is configured to:

in case the estimated lid angle is greater than 180 degrees and equal to or less than 270 degrees, set the estimated lid angle to 180 degrees; and in case the estimated lid angle is greater than 270 degrees and equal to or less than 360 degrees, set the estimated lid angle to 0 degrees.

3. The device of claim 1 wherein the first orientation is a first quaternion of the first component, and the second orientation is a second quaternion of the second component, and the third processor is configured to:

determine a difference quaternion based on the first quaternion and the second quaternion; and determine the distance based on the difference quaternion.

4. The device of claim 3 wherein the third processor is configured to:

determine a rotated vector part based on a vector part of the difference quaternion rotated by the first quaternion.

5. The device of claim 4 wherein the third processor is configured to:

remap the distance to the estimated lid angle based on rotated vector part.

6. The device of claim 1 wherein the first processor determines the first orientation and the second processor determines the second orientation in a case where the device is in a sleep state, and the third processor determines the distance and remaps the distance to the estimated lid angle in a case where the device is in an awake state.

7. The device of claim 6 wherein the third processor is configured to set the estimated lid angle as an initial lid angle of the device, and the initial lid angle is an angle relative to the hinge axis and between the first component and the second component subsequent to the device exiting the sleep state and entering the awake state.

8. The device of claim 7 wherein the third processor sets the estimated lid angle as the initial lid angle in a case where the device is in an upright position or in a non-steady state.

9. The device of claim 1 wherein the third processor is configured to:

determine the device is in a flat state in which the first user interface and the second user interface face the same direction;

determine the device is in a steady state; and reset orientation processing logic of the first sensor unit and orientation processing logic of the second sensor unit in a case where the device is in the flat state and the steady state.

10. The device of claim 1 wherein the third processor is configured to:

determine the device is in a steady state;

determine the device is in a flat state or a closed state, the first user interface and the second user interface facing the same direction in the flat state, the first user interface and the second user interface facing each other in the closed state; and reset orientation processing logic of the first sensor unit and orientation processing logic of the second sensor unit in a case where the device is in (1) the steady state and (2) the flat state or the closed state.

11. The device of claim 1 wherein the third processor is configured to:

realign the second orientation with the first orientation based on the first orientation and a current lid angle between the first component and the second component.

12. A method, comprising:

determining, by a first sensor unit, a first orientation of a first component of a device, the first component including a first user interface and the first sensor unit, the first sensor unit including a first accelerometer and a first gyroscope, the first sensor unit determining the first orientation based on measurements by the first accelerometer and the first gyroscope;

determining, by a second sensor unit, a second orientation of a second component of the device, the first component and the second component configured to rotate relative to a hinge axis, the second component including a second user interface and the second sensor unit, the second sensor unit including a second accelerometer and a second gyroscope, the second sensor unit determining the second orientation based on measurements by the second accelerometer and the second gyroscope; and determining, by a third processor, a distance between the first orientation and the second orientation; and remapping, by the third processor, the distance to an estimated lid angle relative to the hinge axis and between the first component and the second component, the estimated lid angle having a value between 0 and 360 degrees.

13. The method of claim 12 wherein the first orientation is a first quaternion of the first component, and the second orientation is a second quaternion of the second component.

14. The method of claim 13, further comprising:

determining, by the third processor, a difference quaternion based on the first quaternion and the second quaternion; and determining, by the third processor, the distance based on the difference quaternion.

15. The method of claim 14, further comprising:

determining, by the third processor, a rotated vector part based on a vector part of the difference quaternion rotated by the first quaternion.

16. The method of claim 15, further comprising:

remapping, by the third processor, the distance to the estimated lid angle based on rotated vector part.

17. A device, comprising:

a first multi-sensor device;

a first housing including the first multi-sensor device, the first multi-sensor device configured to determine a first orientation of the first housing based on measurements generated by the first multi-sensor device;

a second multi-sensor device;

a second housing coupled to the first housing, the first housing and the second housing configured to rotate relative to a hinge axis, the second housing including the second multi-sensor device, the second multi-sensor device configured to determine a second orientation of the second housing based on measurements generated by the second multi-sensor device; and a processor configured to:

determine a distance between the first orientation and the second orientation; and remap the distance to an estimated lid angle relative to the hinge axis and between the first housing and the second housing, the estimated lid angle having a value between 0 and 360 degrees.

18. The device of claim 17 wherein the first orientation is a first quaternion of the first housing, and the second orientation is a second quaternion of the second housing, and the processor is configured to:

determine a difference quaternion based on the first quaternion and the second quaternion; and determine the distance based on the difference quaternion.

19. The device of claim 18 wherein the processor is configured to:

determine a rotated vector part based on a vector part of the difference quaternion rotated by the first quaternion.

20. The device of claim 19 wherein the processor is configured to:

remap the distance to the estimated lid angle based on rotated vector part.

* * * * *